(No Model.) 2 Sheets—Sheet 1.
M. W. BOHN & J. H. MACHEN.
BABY CARRIAGE BRAKE.
No. 506,970. Patented Oct. 17, 1893.
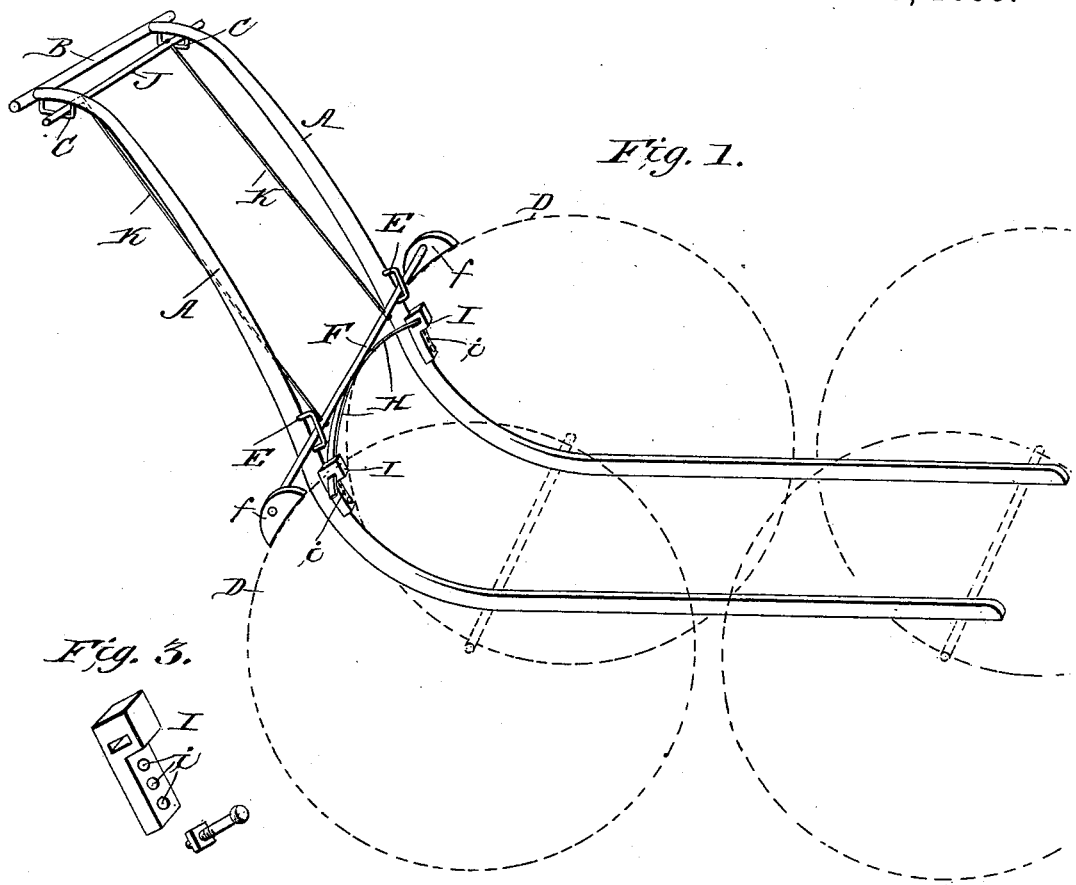
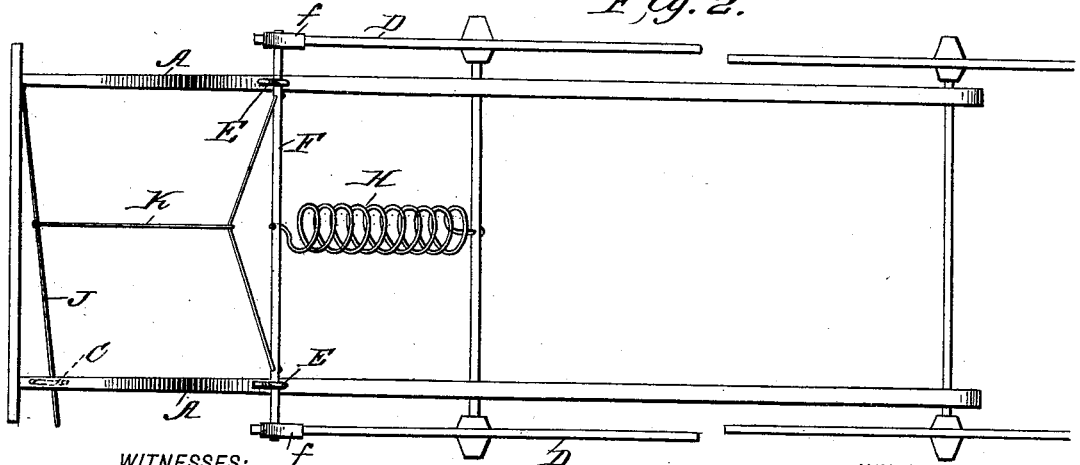
WITNESSES:
Fred G. Dieterich
P. B. Turpin
INVENTORS
Milton W. Bohn,
J. H. Machen.
BY Munn & Co
ATTORNEYS.

(No Model.) 2 Sheets—Sheet 2.
M. W. BOHN & J. H. MACHEN.
BABY CARRIAGE BRAKE.
No. 506,970. Patented Oct. 17, 1893.
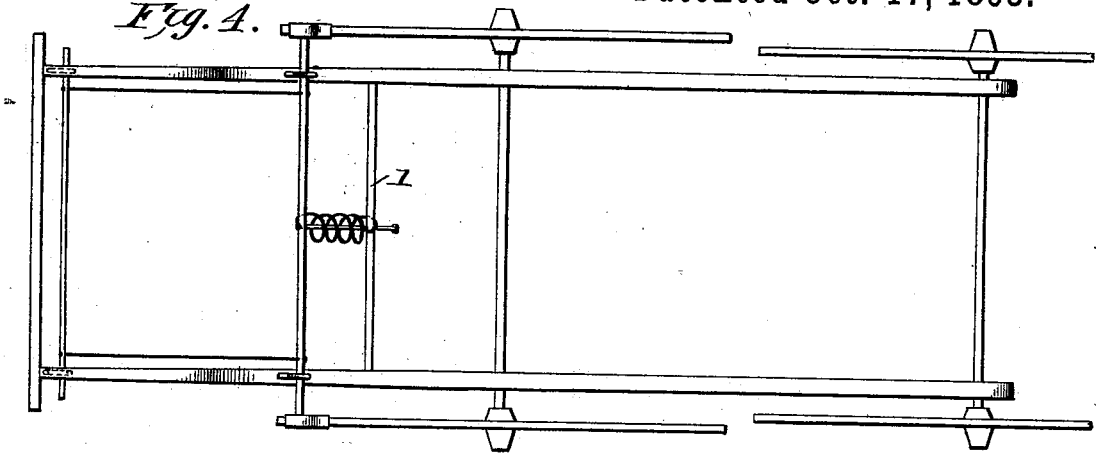
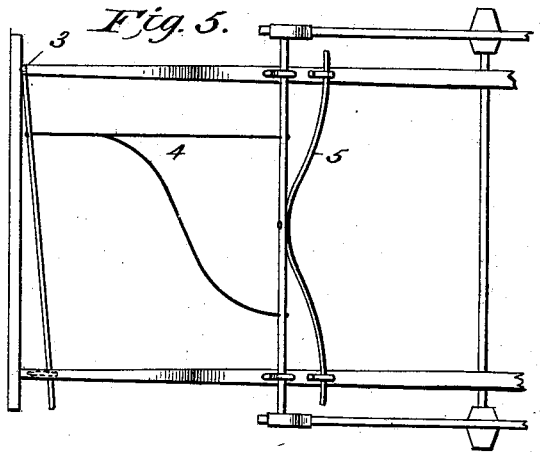
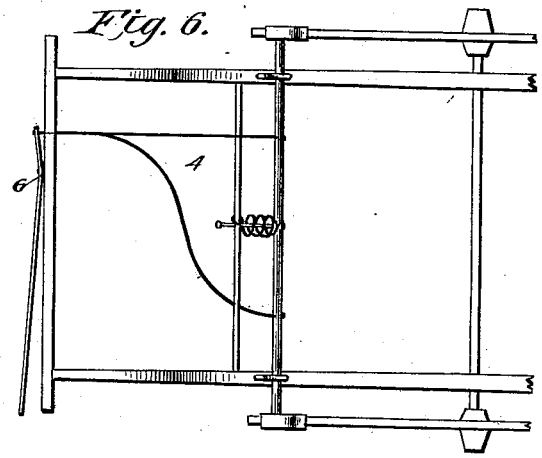
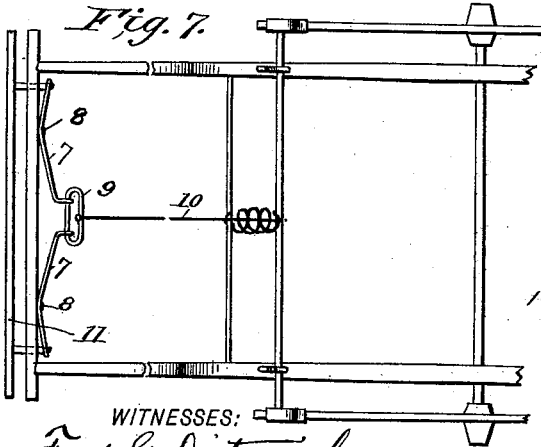
WITNESSES:
Fred G. Dieterich
P. B. Turpin.
INVENTORS
Milton W. Bohn.
J. H. Machen.
BY Munn & Co
ATTORNEYS.

UNITED STATES PATENT OFFICE.

MILTON W. BOHN AND JAMES H. MACHEN, OF NORFOLK, VIRGINIA.

BABY-CARRIAGE BRAKE.

SPECIFICATION forming part of Letters Patent No. 506,970, dated October 17, 1893.

Application filed December 31, 1892. Serial No. 456,878. (No model.)

*To all whom it may concern:*

Be it known that we, MILTON W. BOHN and JAMES H. MACHEN, of Norfolk, in the county of Norfolk and State of Virginia, have invented a new and useful Improvement in Baby-Carriage Brakes, of which the following is a specification.

This invention is an improvement in brakes or locks for baby carriages and the like, such for instance, as invalid chairs and other vehicles of like character, and the invention consists in the construction and combination of parts hereinafter described and pointed out in the claims.

In the drawings—Figure 1 is a perspective view of our invention. Fig. 2 is a plan view thereof showing a somewhat different arrangement. Fig. 3 is a detail view, and Figs. 4 to 8 inclusive show different constructions within the broad principles of the improvement.

We will first describe the constructions shown in Figs. 1 to 3 and then the constructions shown in the other figures.

The purpose of the invention is to provide means, simple and inexpensive which will brake or lock the vehicle from movement, except when it is being propelled by the attendant. To this end we provide a brake, impelled normally into engagement with the wheel, a hand hold, adjacent to the handle of said vehicle, and connection between the hand hold and the brake, whereby the attendant may in propelling the vehicle also grasp the hold and retain the brake out of engagement with the wheel, so that the vehicle may be freely propelled.

In the construction shown in Figs. 1 and 2 the vehicle has its handle side bars A A provided near the handle bar B with guides C, and near the wheels D with guides E, the guides E being shown above and those C below the handle bars A and the several guides being in the nature of staples to hold and permit the hand hold and brake beam to move along the handle bars A. The brake shoes *f* at the ends of the beam F, are arranged and adapted to engage the wheels D and this beam is actuated by a spring to press said shoes normally into engagement with the wheels. The spring may be a coil spring, as shown in Fig. 2 but it is preferably a plate spring H as shown in Fig. 1 connected with the brake beam and held at its ends in keeper blocks I secured to the handle bars. These blocks I are provided with a series of holes *i* for the fastening screws so that the blocks may be adjusted upon the bars A.

The hand hold J is arranged parallel to and near the cross bar B, and is connected near its ends by pitmen or rods K, with the brake beam so that when said hand hold is grasped and pressed toward and against the handle bar B the brake shoes will be held clear of the wheels. It will also be seen that when the hand hold is released the spring will at once actuate the brake shoes into engagement with the wheels and stop the vehicle whether it be on a grade or level.

Manifestly the connections between the hand hold and the brake beam may be modified for instance, as shown in Fig. 2 where a single rod connects with the hand hold and with branches leading to the brake beam, in which view we also show a coil spring for actuating the brake bar.

The construction employed is simple, adapted for application to the ordinary style of baby carriages, and can be so applied without the necessity of calling in a skilled mechanic.

It is not necessary for the attendant to apply the brake on leaving the vehicle as such application is automatically made the instant the hand hold is released such automatic operation avoiding all accidents which might result from carelessness on the part of the nurse or other attendant.

Fig. 4 shows a construction similar to Fig. 1 except that in Fig. 4 a coil spring is used and cross bar 1 connects the handle bars and forms a support for the coil spring a rod 2 being projected from the brake bar and extending through the spring and playing through the bar 1.

In Fig. 5 the hand hold is pivoted at one end at 3 and connects by a yoke like connection 4 with the brake bar a plate spring 5 being arranged to actuate the said bar.

In Fig. 6 the hand hold is pivoted between its ends at 6 and is connected by a yoke like part 4 with the brake bar, a coil spring being shown for actuating said brake bar.

Fig. 7 shows two levers 7 pivoted at 8 to the handle bar connected at one end with the brake bar by link 9 and rod 10 and connected at their other ends with a push bar 11 arranged to be moved toward and from the handle bar as the latter is grasped and re-
leased.

Fig. 8 shows a lever 12 pivoted between its ends at 13 and provided at one end with a button like handle 14 by which it may be operated to release the brake the other end of the lever being connected by a yoke 4 with the brake bar.

Manifestly these constructions are within the broad principles of our invention.

Having thus described our invention, what we claim as new, and desire to secure by Letters Patent, is—

1. In a vehicle substantially as described the combination of the handle side bars the brake bar movable toward and from the wheel, a plate spring held at its ends to the handle side bars and connected between its ends with the brake bar to actuate the same, and devices adjacent to the handle cross bar and connected with the brake bar to operate the same in opposition to the spring bar all substantially as set forth.

2. In a vehicle substantially as described the combination of the handle side bars, the brake bar the spring bar secured between its ends to the brake bar the blocks provided with seats for the ends of the spring bar and having a series of perforations for the fastening bolts whereby the position of the blocks upon the handle bars may be adjusted, and devices adjacent to the handle cross bar and connected with the brake bar whereby to operate the same in opposition to the spring bar all substantially as set forth.

3. The combination of the handle side bars A and cross bar B, the staple guides C secured to the side bars A near their ends, the guides E secured to the bars A shortly in rear of the rear wheels, the blocks I held to the side bars and having seats for the ends of the spring bar, the brake bar held movably in guides E, the spring bar connected at its middle with the brake bar and fitted at its ends in the seats of blocks I, the bar J held at its ends in the guides C and connections between the bar J and the brake bar all substantially as set forth.

4. The improvement in brakes for baby carriages substantially as described comprising the brake bar, guides whereby said bar may be held movably to the handle side bars, the spring bar secured between its ends to the brake bar, and the blocks provided with seats for the ends of the spring bar and provided each with a series of bolt holes all substantially as and for the purposes set forth.

MILTON W. BOHN.
JAMES H. MACHEN.

Witnesses:
DAVID OWEN THOMAS,
ALVIN F. LEH.